United States Patent
Auchmoody et al.

(10) Patent No.: US 9,262,280 B1
(45) Date of Patent: Feb. 16, 2016

(54) AGE-OUT SELECTION IN HASH CACHES (71) Applicant: EMC Corporation, Hopkinton, MA (US)

(72) Inventors: Scott C. Auchmoody, Irvine, CA (US); Scott Ogata, Lake Forest, CA (US)

(73) Assignee: EMC CORPORATION, Hopkinton, MA (US)

( * ) Notice: Subject to any disclaimer, the term of this patent is extended or adjusted under 35 U.S.C. 154(b) by 0 days.

(21) Appl. No.: 14/474,755

(22) Filed: Sep. 2, 2014

Related U.S. Application Data (63) Continuation of application No. 11/967,871, filed on Dec. 31, 2007, now Pat. No. 8,825,971.

(51) Int. Cl.
*G06F 3/06* (2006.01)
*G06F 11/14* (2006.01)
*G06F 12/08* (2006.01)

(52) U.S. Cl.
CPC ............ *G06F 11/1464* (2013.01); *G06F 3/067* (2013.01); *G06F 3/0608* (2013.01); *G06F 3/0614* (2013.01); *G06F 3/0641* (2013.01); *G06F 12/0891* (2013.01); *G06F 2212/154* (2013.01)

(58) Field of Classification Search
CPC ..... G06F 3/0641; G06F 3/0614; G06F 3/067; G06F 3/06; G06F 11/1464; G06F 12/0891; G06F 2212/1548
USPC ............ 711/133, 134, 154, 161; 707/999.006
See application file for complete search history.

(56) References Cited

U.S. PATENT DOCUMENTS

| | | |
|---|---|---|
| 6,704,730 B2 | 3/2004 | Moulton et al. |
| 6,810,398 B2 | 10/2004 | Moulton |
| 6,928,526 B1 | 8/2005 | Zhu et al. |
| 7,680,998 B1 | 3/2010 | Auchmoody et al. |

OTHER PUBLICATIONS

Podlipnig et al., A Survey of Web Cache Replacement Strategies, Dec. 2003, ACM Computing Surveys, 25 pages.
U.S. Appl. No. 11/967,871, Dec. 17, 2010, Office Action.
U.S. Appl. No. 11/967,871, Jun. 22, 2011, Final Office Action.
U.S. Appl. No. 11/967,871, Dec. 23, 2011, Office Action.
U.S. Appl. No. 11/967,871, Jun. 18, 2012, Final Office Action.
U.S. Appl. No. 11/967,871, Dec. 21, 2012, Office Action.
U.S. Appl. No. 11/967,871, Jun. 27, 2013, Final Office Action.
U.S. Appl. No. 11/967,871, Jan. 15, 2014, Office Action.
U.S. Appl. No. 11/967,871, Apr. 25, 2014, Notice of Allowance.

*Primary Examiner* — Gary W Cygiel
(74) *Attorney, Agent, or Firm* — Workman Nydegger (57) ABSTRACT

A backup client de-duplicates backup data sets using a locally stored, memory resonant, root tag vector and hash cache. To create a new backup data set, the client queries a backup server to determine which of the root hashes in the root tag vector are available on the backup server. If one or more are no longer available, the backup server re-uses a root tag vector entry corresponding to one of the no longer available root hashes. If all are available, the client ages out a root hash for re-use based on a combination of age and represented size. Data is de-duplicated by chunking and hashing it and comparing the resulting hashes to hashes in the hash cache. To prevent the hash cache from growing too large, entries in the hash cache are aged out based on a combination of age and size of data represented by the entries.

12 Claims, 10 Drawing Sheets

AGE-OUT SELECTION IN HASH CACHES

CROSS-REFERENCE TO RELATED APPLICATIONS

The present application is a Continuation of U.S. patent application Ser. No. 11/967,871, filed Dec. 31, 2007, and issued Sep. 2, 2014 as U.S. Pat. No. 8,825,971, which is hereby incorporated by reference in its entirety.

BACKGROUND OF THE INVENTION

1. The Field of the Invention

The present invention relates to data storage and backup solutions for archiving data. More particularly, embodiments of the invention relate to hardware, software, systems, and methods for aging out entries in a root tag vector and/or hash cache of a backup client.

2. The Relevant Technology

The need for reliable backup and archiving of information is well known. Businesses are devoting large amounts of time and money toward information system (IS) resources that are devoted to providing backup and archive of information resident in computers and servers within their organizations that produce and rely upon digital information. The customers of the data storage industry are more frequently demanding that not only is their data properly backed up but also that such data protection be done in a cost effective manner with a reduced cost per bit for stored data sets.

To address these demands, Content Addressed Storage (CAS) has been developed to provide a more cost effective approach to data backup and archiving. Generally, CAS applications involve a storage technique for content that is in its final form, i.e., fixed content, or that is not changed frequently. CAS assigns an identifier to the data so that it can be accessed no matter where it is located. For example, a hash value may be assigned to each portion or subset of a data set that is to be data protected or backed up. Presently, CAS applications are provided in distributed or networked storage systems designed for CAS, and storage applications use CAS programming interface (API) or the like to store and locate CAS-based files in the distributed system or network.

The usage of CAS enables data protection systems to store, online, multi-year archives of backup data by removing storage of redundant data because complete copies of data sets do not have to be stored as long as that content is stored and available. The use of CAS removes the challenges of maintaining a centralized backup index and also provides a high level of data integrity. CAS-based backup and archive applications have also improved the usage network and data storage resources with better distribution of data throughout a multi-node data storage system.

CAS-based backup and archive applications are also desirable because multi-year or other large backup archives can be stored easily since only a single instance of any particular data object (i.e., content) is stored regardless of how many times the object or content is discovered with the data set being protected or backed up. With CAS, the storage address for any data element or content is generated by an analysis of the contents of the data set itself. Since an exclusive storage address is generated for each unique data element (which is matched with a unique identifier) and the storage address points to the location for the data element, CAS-based architectures have found favor in the storage industry because they reduce the volume of data stored as each unique data object is stored only once within the data storage system.

CAS-based data storage is often used for the storage of de-duplicated backup data sets. To generate a de-duplicated backup data set, data is often chunked into pieces and a hash function is performed on each of the pieces. The resulting hash values can be compared to a database of existing hash values to identify redundant data. In particular, the existing hash values correspond to data pieces that have previously been entered into the CAS system.

De-duplicated backup data sets can be generated by a client or a backup server. When generated by a client, the client may maintain a cache of existing hash values such that the client doesn't have to query the backup server for the presence of every piece of data. When new hash values are encountered, the client may add the new hash values to the cache to aid in the identification of redundant data for future backup data sets. If not controlled, however, the cache can grow to an unmanageable size.

The subject matter claimed herein is not limited to embodiments that solve any disadvantages or that operate only in environments such as those described above. Rather, this background is only provided to illustrate one exemplary technology area where some embodiments described herein may be practiced

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Embodiments of the invention relate to methods and systems for generating de-duplicated backup data sets for archiving in a CAS-based storage system or other storage system. To initiate generation of a backup data set, a backup client ages out and selects a root tag vector entry j for re-use. The new root tag vector entry j will include a root hash representative of the new backup data set when it is complete.

To identify and eliminate redundant data, the backup client may break files into chunks and hash the chunks to obtain a plurality of hash values. The hash values are compared to entries in a filename cache and/or hash cache that includes existing hash values corresponding to files and/or pieces of data previously backed up. The cache entries may include a tag field identifying which root hashes in the root tag vector a given cache entry is protected by. Thus, prior to identifying and eliminating redundant data, the backup client may zero out or otherwise modify the tag bit corresponding to the re-used root tag vector entry j to indicate that the cache entries are no longer protected by the old root hash N. The backup client may further generate a tag mask for the filename and/or hash cache identifying which root hashes exist on a backup server and which of the existing root hashes the cache entries are protected by.

After generating the tag mask and/or zeroing out the tag bit field corresponding to the re-used root tag vector entry, the backup client identifies and eliminates redundant data by breaking files into pieces, hashing the pieces, and comparing the hashes to hash entries in the filename and/or hash cache. When new hashes are encountered, the backup client may add the new hashes to the filename and/or hash cache to be utilized in identifying redundant data in the future. Finally, the backup client may provide all new hash values and new data to the backup server for storage.

To age out and select the root tag vector entry j for re-use, the backup client may first ask the backup server to validate all of the entries in the root tag vector (e.g., all of the root hashes). After receiving a response from the server, the backup client determines whether all of the root hashes in the root tag vector still exist on the backup server. If they do, the backup client selects a root hash for re-use based on a combination of the age and size of the backups represented by the root hashes. If one or more of the root hashes no longer exist on the backup server, the backup client re-uses a root tag vector entry corresponding to the one or more no longer existing root hashes.

To prevent the filename and/or hash cache from growing too large when adding new hash values, the backup client may first age out hash entries from the filename and/or hash cache. This may include recording last access times and represented byte sizes for entries in the filename and/or hash cache and then identifying entries to age out based on a combination of last access times and represented byte sizes. The identified entries can then be deleted from the filename and/or hash cache and replaced with new entries without the filename and/or hash cache growing too large.

To practice the invention, the client, backup server, and storage may be any devices useful for providing the described functions, including well-known data processing and storage and communication devices and systems such as computer devices typically used as hosts in user systems with processing, memory, and input/output components, and server devices configured to maintain and then transmit digital data over a communications network. Data typically is communicated in digital format following standard communication and transfer protocols. The data storage resources are generally described as disk, optical, and tape devices that implement RAID and other storage techniques and that may use SCSI and other I/O, data transfer, and storage protocols, but the invention is not intended to be limited to the example embodiments or to specific hardware and storage mechanisms as it is useful for nearly any data storage arrangement in which backups of digital data are generated and maintained.

Figure 1:
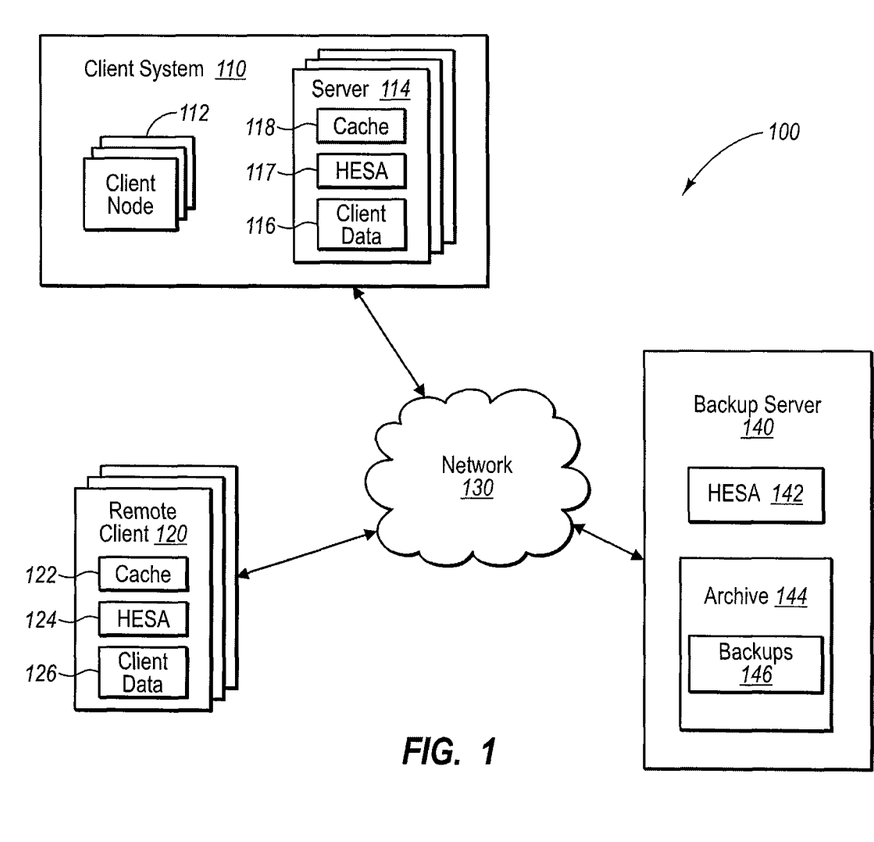
FIG. 1 illustrates an example operating environment in which embodiments of the invention can be implemented.

With reference now to FIG. 1, a data storage (or data protection) system 100 is illustrated which implements aspects of the invention. The system 100 represents a distributed network of computer systems/devices that generate digital data that is protected with copies stored in an archive or backup file system (such as a disk, tape, or other archival solution). The backup or data protection is managed by a backup server 140 that may be provided remotely as shown and/or be provided all or in part as part of a client system (e.g., client systems 110, 120 may include an instance of a storage application). The backup server 140 may also be referred to as a data storage management system, hash file system ("HFS") server, or content addressed storage ("CAS") server.

As shown, the system 100 includes a client system or network 110 such as a data center that includes a plurality of client nodes 112 such as desktops, laptops, servers or the like that are networked to one or more servers (or other memory devices) 114. Each server 114 may include memory for storing one or more caches 118. Client data 116 generated and/or accessed by the client nodes 112 can additionally be stored on the servers 114 to allow ready access.

One or more remote clients 120 can link to the client system 110 and/or to the data storage management system 140 via communications network 130 (e.g., a LAN, a WAN, the Internet, or other wired and/or wireless digital communications networks). The remote client 120 also includes memory for storing one or more caches 122. In addition, the remote client 120 may store client data 126 generated and/or accessed by the remote client 120.

In the embodiment of FIG. 1, the client data 116, 126 is managed for data protection by a high efficiency storage application 117, 124 on each of the client systems 110, 120. Generally, such data protection involves the high efficiency storage applications 117, 124 generating backups for storage in the archive 144. The archive 144 may take many forms such as content addressed storage ("CAS"), disk storage, holographic systems, tape storage, other memory mechanisms, and combinations of such mechanisms that are useful for archiving large amounts of digital information. Further, the archive 144 may be integrated with the HFS server 140 as shown and/or may be in a remote location. In the present embodiment, the archive 144 comprises a CAS system.

In one embodiment of the invention, the storage applications 117, 124 are high efficiency storage applications that control the size of the generated backups 146 such as by storing limited copies of data objects or atomics and/or changes to stored content. For example, the applications 117, 124 may be CAS or HFS applications. Various embodiments of example CAS systems and related methods are disclosed in U.S. Pat. No. 6,704,730 (the '730 patent) and U.S. Pat. No. 6,810,398 (the '398 patent), both of which are incorporated by reference in their entirety.

Alternately or additionally, the backups generated at each of the client systems 110, 120 may be transmitted to the backup server 140 prior to being data de-duplicated. In this case, the backup server 140 may include a high efficiency storage application 142, similar to the storage applications 117, 124 described above, for de-duplicating the backups 146 stored in the archive 144.

Typically, each of the backups 146 represents a secondary copy of the production client data 116, 126 as of a particular point in time. For instance, each storage application 117, 124 may generate backups at different times, such as hourly, daily, weekly, and the like or any combination thereof. Additionally, the size of a backup can be minimized, thereby conserving network resources, by including only new/changed data in the backup.

The backup server 140 receives and stores backups generated at each of the client systems 110, 120 in the archive 144. The backup server 140 implements a hash file system ("HFS") to store and retrieve data from the CAS archive 144. Backup data stored in the CAS archive 144 may be of three basic types: (1) atomic data, also referred to as chunks, blocks, or pieces of data, (2) composite data, or recipes for constructing larger chunks of data that includes hashes pointing to atomic data and/or other composite data and offsets explaining how to combine the atomic and/or other composite data, and (3) directory element data for every backed up file, which includes metadata, filename, modify times, sizes, attributes, Access Control Lists (ACLs), and one or more hashes pointing to the contents of the file. Although not illustrated, the backup server 140 may further include a user accounting system which allows symbolic lookup of root hashes for file systems stored in the CAS archive 144.

Figure 2:
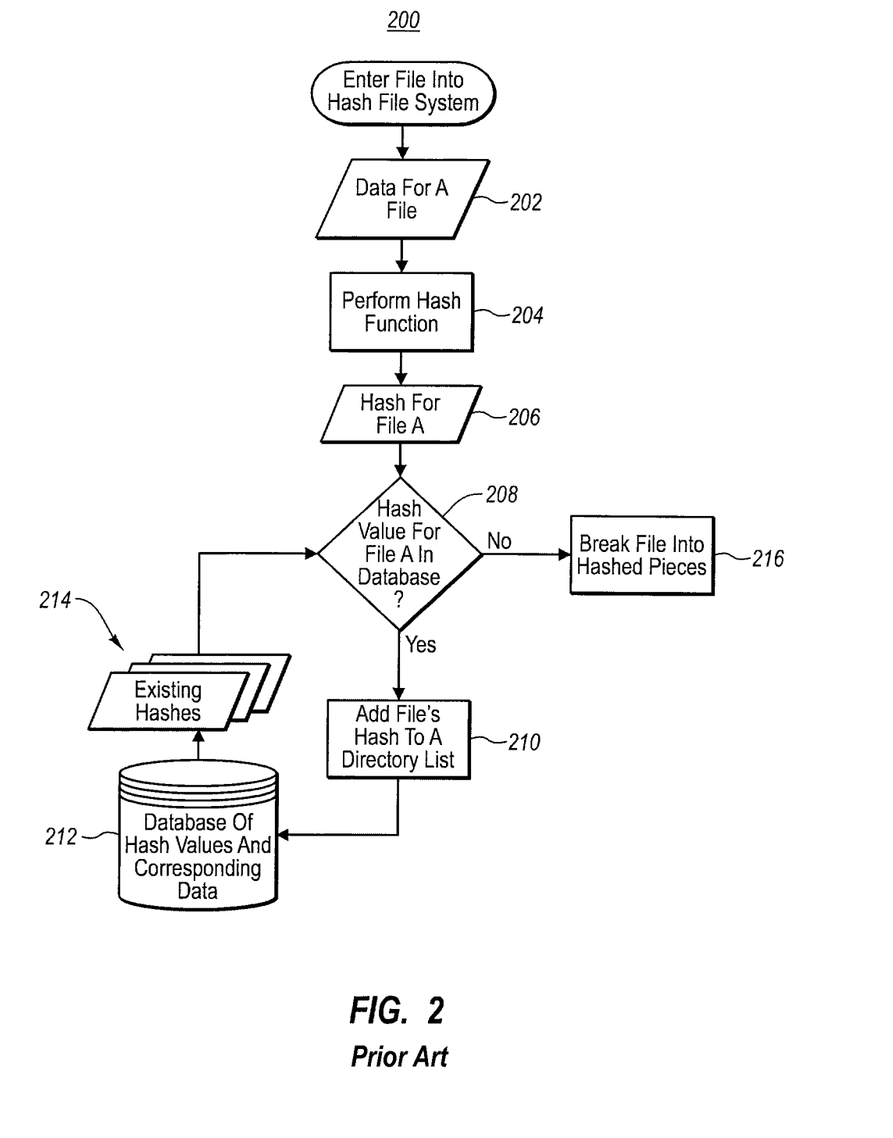
FIG. 2 is an example logic flow chart depicting steps in the entry of a computer file into a hash file system.

With reference additionally now to FIG. 2, a logic flow chart is shown depicting the process of entry of a computer file 202 into the CAS archive 144. The computer file 202 may be generated by a user on a client node or on a remote client, for example, and may correspond to the client data 116 or 126. Any digital sequence could also be entered into the archive 144 of the HFS server 140 in the present embodiment in much the same way, but the current example wherein the digital sequence entered consists of a computer file is instructive.

The process 200 begins by performing 204 a hash function on File A 202 and the resulting hash value (also referred to as a "hash" or "content hash") 206 of File A is compared 208 to the contents of a database 212 containing hash file values. In one embodiment, the database 212 corresponds to the backup server 140 and/or archive 144 of FIG. 1. If the hash value 206 of File A is already in the database, then the file's hash value is added 210 to a directory list or hash recipe. This hash recipe includes, in one embodiment, the data and associated structures needed to reconstruct a file, directory, volume, or entire system depending on the class of computer file data entered into the system. The contents of the database 212 comprising hash values and corresponding data is provided in the form of existing hash values 214 for the comparison operation of decision step 208.

Figure 3:
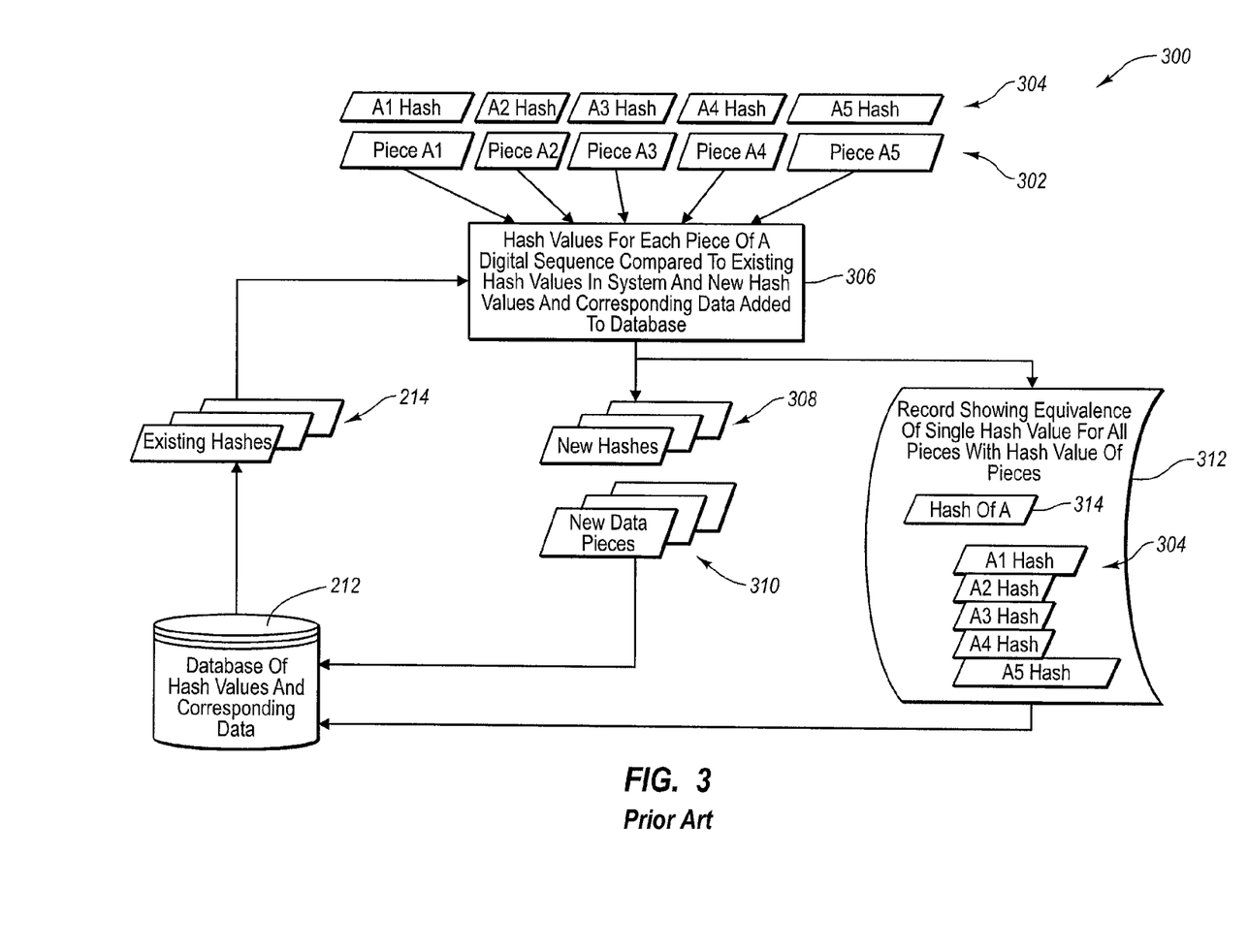
FIG. 3 is a further example logic flow chart depicting steps in the entry of individual pieces of a computer file into a hash file system.

On the other hand, if the hash value 206 for File A is not currently in the database, at step 216 the file is broken into pieces 302 and each piece is hashed to generate hash values 304, illustrated in FIG. 3. In one embodiment, File A is divided into pieces based on commonality with other pieces in the system or the likelihood of pieces being found to be in common in the future according to the stick byte algorithm described in the '730 and '398 patents. Alternately or additionally, File A may be divided into pieces using other algorithms that generate pieces of variable or fixed sizes.

FIG. 3 further depicts a comparison process 300 for the hash values 304 of each piece 302 of the File A to those of existing hash values 214 maintained in the database 212 of FIG. 2. Particularly, the hash values 304 for each piece 302 of the file are compared 306 to existing hash values 214 and new hash values 308 and corresponding new data pieces 310 are added to the set 212. In this way, hash values 308 not previously present in the database set 212 are added together with their associated data pieces 310. The process 300 also results in the production of records 312 (also referred to as composites or recipes) showing the equivalence of a single hash value 314 for all file pieces with the hash values 304 of the various pieces 302

Various hashing algorithms can be implemented by the storage applications 117, 124 to obtain hash values of files, composites, file pieces, and the like, including SHA1, MD5, and the like or any combination thereof.

Figure 4:
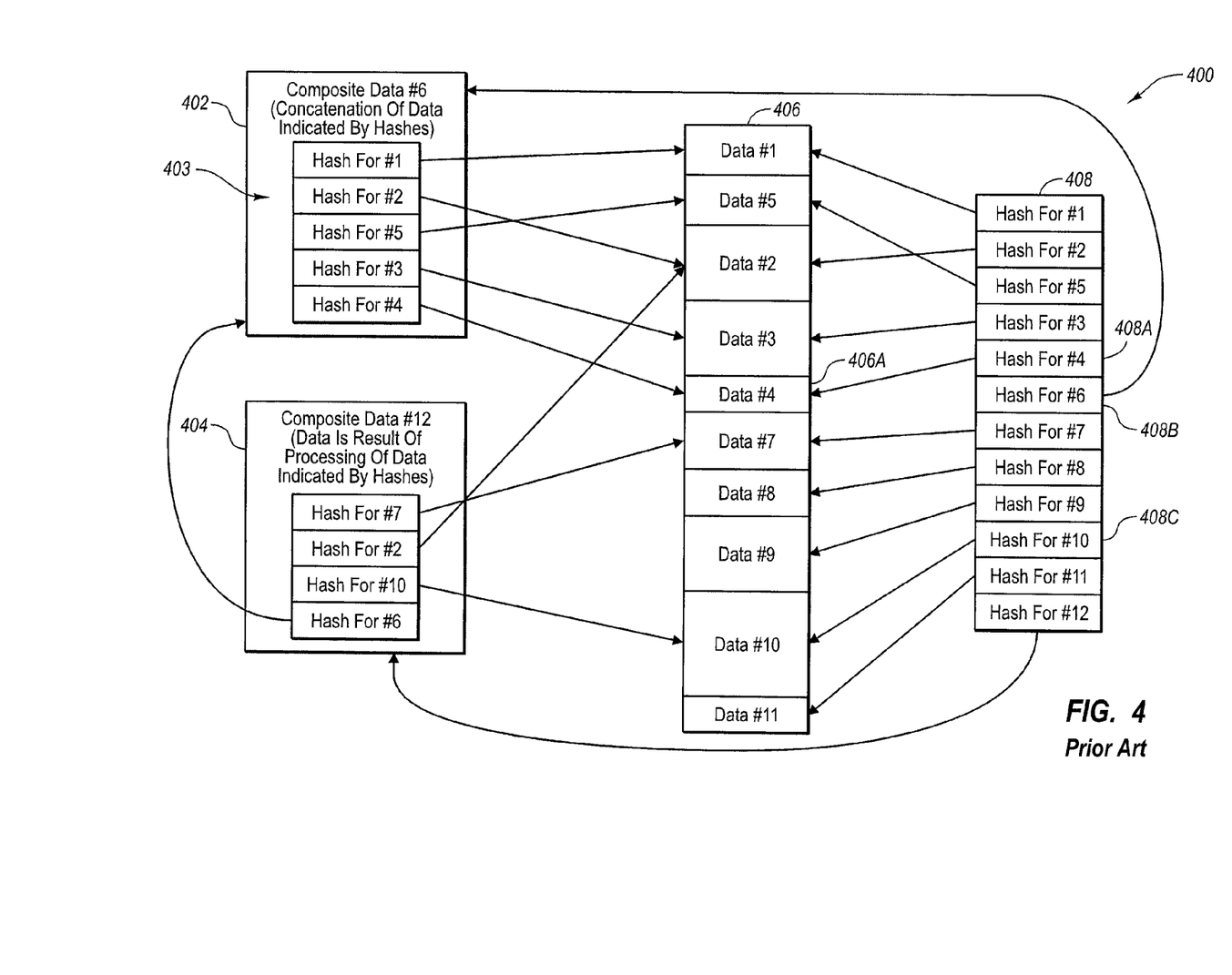
FIG. 4 is a representation of example composite data that may include a recipe for the concatenation of data atomics or other composite data in a hash file system.

With reference additionally now to FIG. 4, a representation 400 is shown illustrative of the fact that composite data (such as composite data 402 and 404) derived by means of the system and method of the present invention is effectively the same as the data 406 represented explicitly but is instead created by a "recipe" or formula. Each recipe may include the concatenation of data represented by one or more hashes (selected from the hashes 408) within the recipe and/or the result of a function using the data represented by the hashes. For example, the recipe for composite data 402 includes the concatenation of data represented by hash values 403. The data blocks or atomics 406 may be variable length blocks as shown and the hash values 408 are derived from their associated data blocks. Note that composite data can reference other composite data many levels deep. As one example, composite data 404 references composite data 402. Further, the hash values for the composite data 402, 404 can be derived from the value of the data the recipe creates or the hash value of the recipe itself.

Figure 5:
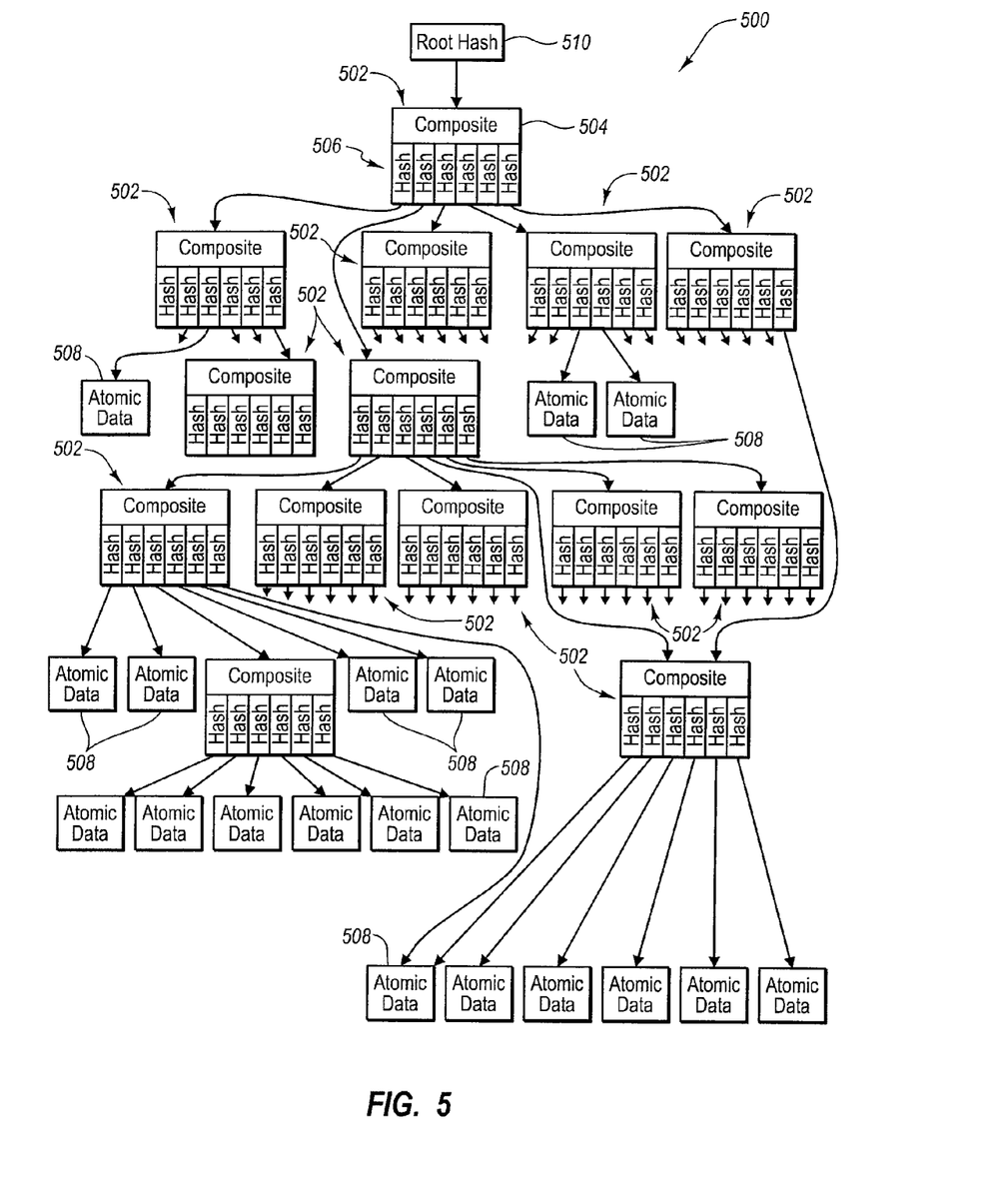
FIG. 5 depicts an example representation of how a hash file system can be utilized to organize data.

With reference additionally now to FIG. 5, another conceptual representation 500 is shown of how the hash file system and method of the invention may be utilized to organize data 502 to optimize the reutilization of redundant sequences through the use of hash values 506 as pointers to the data they represent and wherein data 502 may be represented either as explicit byte sequences (atomic data) 508 or as groups of sequences (composites) 504.

The representation 500 illustrates the tremendous commonality of recipes and data that gets reused at every level. The basic structure of the hash file system of the present embodiment is essentially that of a "tree" or "bush" wherein the hash values 506 are used instead of conventional pointers. The hash values 506 are used in the recipes (e.g., composites) to point to the data or another hash value that could also itself be a recipe. In essence, then, recipes can point to other recipes that point to still other recipes that ultimately point to some specific data (e.g., atomic data), eventually getting down to nothing but data.

At the topmost level of the tree 500 of FIG. 5, a hash can be performed to generate a root hash 510. Because the hashes performed at each level of the tree result in the production of probabilistically unique hash values for each corresponding piece of data or composite upon which the hash is performed, the existence of the root hash 510 in the database 212 (e.g., on the backup server 140) implicates the existence of all the data and composites beneath the root hash somewhere on the backup server. In other words, if the root hash 510 exists in the database 212 (e.g., as one of the existing hashes 214), then all of the data referenced at any level within the tree of the root hash 510 exists somewhere on the system 140.

Conversely, if data stored on the backup server 140 is not referenced or pointed to by a root hash, there is no need to store the data on the system 140 and it can be collected away. For instance, the backup server 140 may age out backups after a certain period of time according to a data retention plan by deleting the corresponding root hashes from database 212 and performing garbage collecting (e.g., identifying and deleting data and hash values not referenced by any root hashes).

The methods and systems described with respect to FIGS. 2 through 5 can be implemented by a storage application on a client 110, 120 or a backup server 140 to generate de-duplicated backup data sets. When performed by a client-side storage application 117, 124, the methods described above can be adapted to reduce strain on network resources. For instance, in FIGS. 2 and 3, redundant files and/or file pieces are identified and eliminated from a backup data set by comparing hash values for all files and file pieces of the backup data set to existing hash values 214 in the database 212 (which is stored in the CAS archive 144 of FIG. 1). The amount of network bandwidth and the time required to create a de-duplicated backup data set would be significant if the storage application 117 or 124 had to query the backup server with hash values for every file and file piece making up the backup data set.

However, the required network bandwidth and time to create a de-duplicated backup data set can be reduced by each client 110, 120 maintaining a local cache 118, 122 of hash values corresponding to data previously backed up by the corresponding client. In this case, the storage applications 117, 124 can compare hash values to existing hash values stored in the caches 118, 122. If the hash values are already stored in the caches 118, 122, the storage applications 117, 124 can proceed with the methods as described. If the hash values are not already stored in the caches 118, 122, the storage applications 117, 124 can then query the backup server 140 to determine if the hash values (and corresponding data) exist on the backup server 140.

Figure 6A:
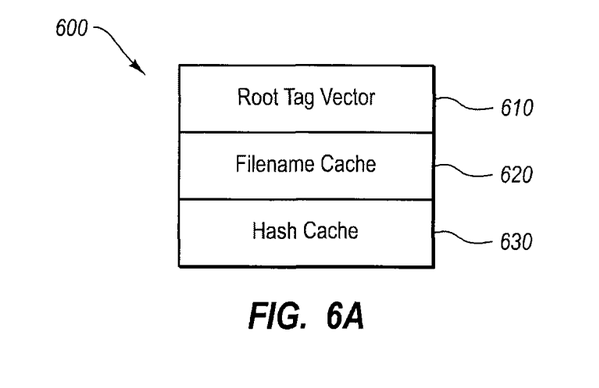
FIGS. 6A-6D illustrate example aspects of a cache that can be used in embodiments of the invention for the entry of files and data into a hash file system.

Referring additionally to FIG. 6A, one embodiment of a cache 600 is illustrated for client-side de-duplication of backup data sets. The cache 600 may correspond to the caches 118, 122 of FIG. 1. As illustrated, the cache 600 includes a root tag vector 610, a filename cache 620, and a hash cache 630. Embodiments of the root tag vector 610, filename cache 620, and hash cache 630 are illustrated in greater detail in FIGS. 6B, 6C, and 6D, respectively.

Figure 6B:
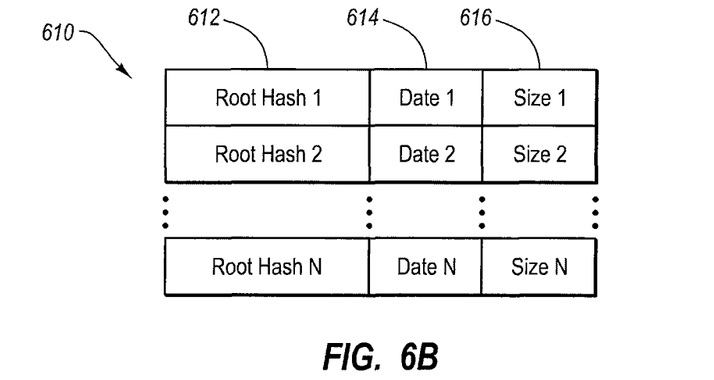

The root tag vector 610 illustrated in FIG. 6B is an array identifying a plurality of root hashes (e.g., $R_1, R_2, \ldots R_N$) corresponding to previous backups generated by the client on which the cache 600 is implemented. Each entry in the root tag vector 610 includes a root hash 612 of a corresponding backup data set, a date 614 the backup data set was created (or an age of the backup data set), and a size 616 of the backup data set. In one embodiment, the root tag vector 610 identifies up to sixteen backups performed by the client in whose cache the root tag vector is stored. However, the number of root hashes identified in the root tag vector can more generally be described as the number of backups typical of a given client.

Figure 6C:
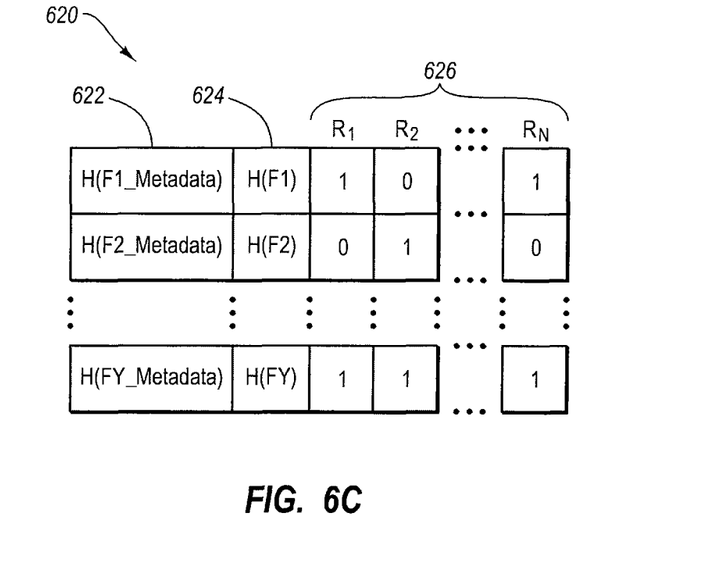

One embodiment of the filename cache 620 is illustrated in FIG. 6C. The filename cache 620 includes a plurality of entries, each entry corresponding to a different file. Each entry in the filename cache 620 may include a hash 622 of the metadata of the file (including, for example, the path, modify time, size, attributes, and other metadata for the file), a hash 624 of the contents of the file, an age (not shown) or last access time of the file represented by each hash 622, 624, a size (not shown) of the file represented by each hash 622, 624, and a tag field 626 indicating which root hashes protect the file.

More specifically, the tag field 626 for each entry includes 1 to N tag bits that identify one or more root hashes (e.g., $R_1, R_2, \ldots R_N$) the file is protected by. Each tag bit $T_i$ corresponds to the root tag vector entry $R_i$. As already mentioned above, the existence of a root hash implicates the existence of all the data (including files) and composites beneath the root hash somewhere in the CAS archive 144. For instance, in the illustrated embodiment, the existence of root hash 1 ($R_1$) implies that the files represented by the hash of File 1 and the hash of File Y have previously been backed up to and are stored in the CAS archive 144.

Figure 6D:
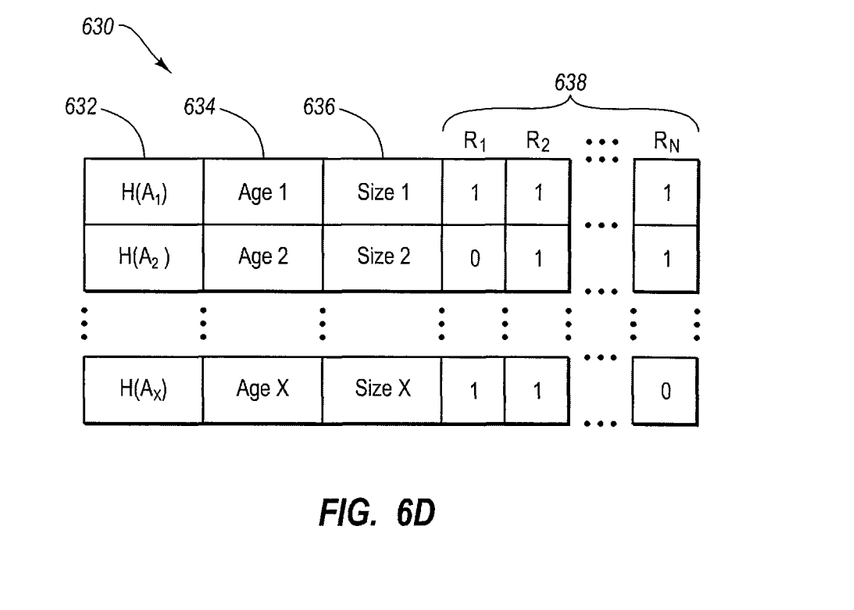

One embodiment of the hash cache 630 is illustrated in FIG. 6D. Similar to the filename cache 620, the hash cache 630 includes a plurality of entries, each entry corresponding to a different composite data or chunk of data. Each entry in the hash cache 630 includes a hash 632 of the data (e.g., a piece of data or a composite data), the age or last access time 634 of the data, the size 636 of the data, and a tag field 638 indicating which root hashes protect the data. The "age" or "last access time" of the data refers to the last time the data was backed up (e.g., the last time the hash of the data was included anywhere beneath a root hash). In one embodiment, the size 636 of data may be a one-byte order of magnitude size expressed as an exponent of two, rather than a more accurate 32-bit size.

As a storage application 117, 124 generates de-duplicated backup data sets, it encounters files, file pieces, composite data, and the like for which representative hash values are not found in the cache 600. In this case, the storage application 117, 124 can add the representative hash values to the cache 600 in order to identify the corresponding files, file pieces, composite data, and the like as redundant data if and when encountered again in the future. If left unchecked, however, the cache 600 can grow to exceed available memory capacity of the clients 110, 120. Thus, embodiments of the invention include methods for identifying and aging entries out of the filename cache 620 and/or hash cache 630.

Further, the number of backups retained by a backup server 140 for a given client may be limited to a particular number N (e.g., 16 in one embodiment). Alternately or additionally, the number of entries in the root tag vector of a given client may be limited to a particular number N. Consequently, embodiments of the invention further include methods for identifying and aging entries out of the root tag vector 610.

Figure 7A:
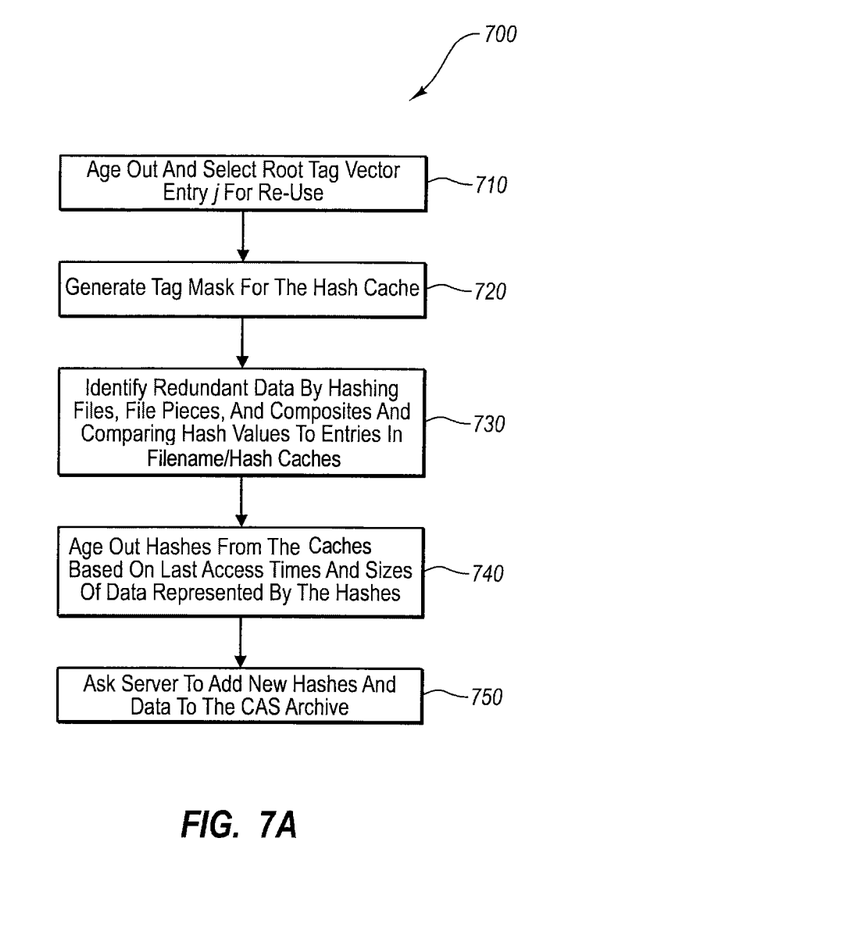
FIG. 7A illustrates an example method for generating a de-duplicated backup data set that includes aging out root tag vector entries and hash cache entries.
Figure 7B:
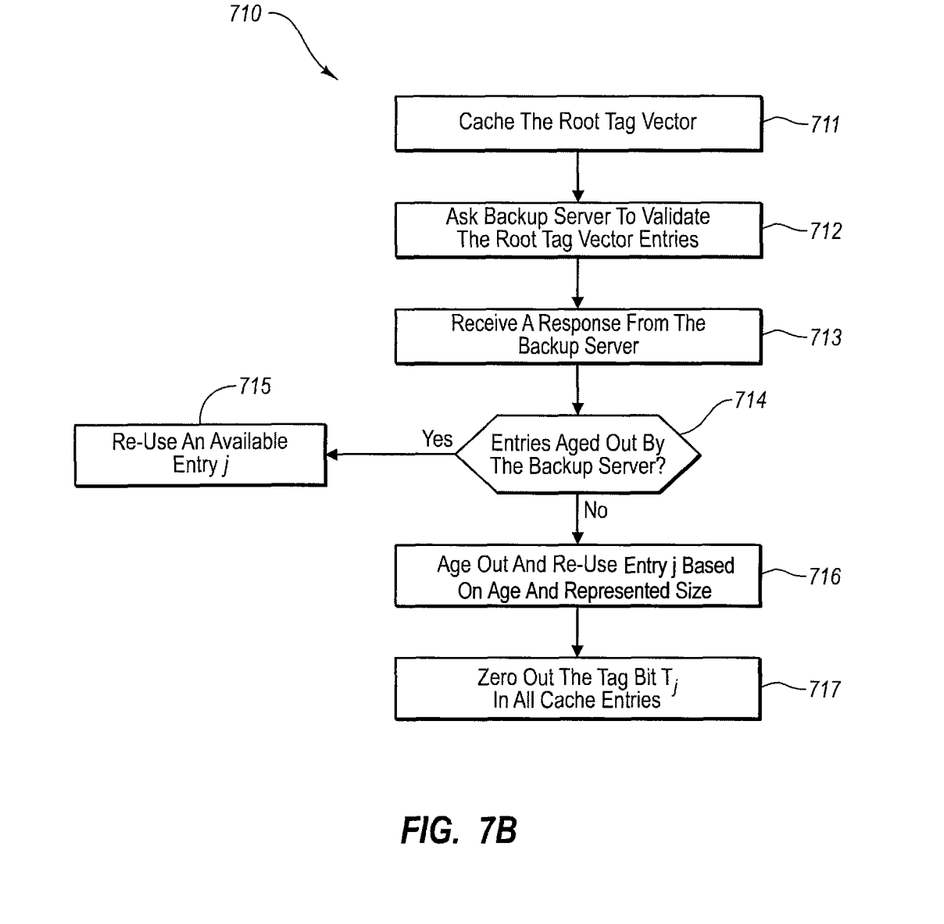
FIG. 7B depicts an example method for aging out entries in a root tag vector that may correspond to one or more of the steps of FIG. 7A.

To place the methods for identifying and aging entries out of the hash cache 630 and/or the root tag vector 610 in context, a method 700 for generating a backup data set will be described with respect to FIG. 7A. The method 700 begins by a client 110 (or more particularly, a storage application 117 on the client) aging out 710 and selecting for re-use one of the entries j in the root tag vector 610. One embodiment of a method 710 for aging out and selecting a root hash entry for re-use is illustrated in FIG. 7B, described below.

Briefly, the method 710 includes querying a backup server 140 to validate entries in the root tag vector and receiving a response from the backup server that may include a bit sequence indicative of which root hashes identified in the root tag vector are available in the CAS archive 144.

At some time during or after execution of the method 710, the method 700 may proceed to generate 720 a tag mask using the response from the backup server 140 and the tags 626, 638 of the filename cache 620 and/or hash cache 630 illustrated in FIGS. 6C and 6D. The tag mask combines the tag field 626, 638 of the corresponding cache entries with the bit sequence returned by the backup server 140 to identify (1) which cache entries are protected by which root hashes and (2) which root hashes are still present on the backup server 140. For instance, if the response from the backup server indicates that root hash 2 ($R_2$) no longer exists on the backup server, the tag bit $T_2$ would be zeroed out for each hash in the filename cache and hash cache. Thus, a nonzero value for any bit in the tag mask indicates that a particular hash in the cache is protected by a particular root hash that has been validated by the backup server. Hashes in the filename and/or hash caches that are not protected by any root hashes, as indicated by the tag mask, can be deleted from the filename and/or hash caches to make room for new hashes.

The method 700 proceeds to step 730 where redundant data is identified by hashing files, file pieces, and/or composite data and comparing the resulting hash values to existing hash values representative of previously backed up data, as described above. In this embodiment, the existing hash values are maintained locally in the filename cache 620 and/or hash cache 630.

In the course of comparing the resulting hash values to existing hash values in the hash cache 630, the client 110 typically encounters one or more new hash values representative of data that has not previously been entered into the hash file system. Alternately or additionally, the data may have previously been entered into the hash file system but the corresponding hash value entries may have been aged out of the filename and/or hash caches. In both cases, the method 700 continues by aging out 740 hash value entries from the filename and/or hash caches to make room for the new hash values. As will be explained below with respect to FIG. 7C, the selection of hash values to be aged out is based on both the last access time of each hash value and the size of the data represented by each hash value.

Finally, the client 110 asks 750 the backup server 140 to add the generated backup data set that includes all new data and/or new hash values to the CAS archive 144 for storage.

Turning now to FIG. 7B, the method 710 for aging out and/or selecting an entry j in a root tag vector for re-use is illustrated. The method 710 begins by caching 711 a root tag vector on a backup client 110. As previously indicated, the root tag vector includes a plurality of entries corresponding to a plurality of previous backup data sets, each entry including a root hash representative of a corresponding backup data set, a date the corresponding backup data set was created, and a size of the corresponding backup data set.

Upon initializing backup generation, the client 110 requests 712 a backup server 140 that stores and ages out previous backup data sets to validate or identify which of the previous backup data sets are still available on the backup server. This may include providing all of the root hashes in the root tag vector to the backup server 140 so that the backup server can compare the root hashes to hash values stored on the backup server.

The client 110 receives 713 a response from the backup server validating or identifying which of the root hashes/backup data sets identified in the root tag vector are available on the backup server. As mentioned above, the response from the backup server may be a bit sequence indicative of which root hashes identified in the root tag vector are available on the backup server 140. For instance, each root hash that is available may be recorded as a "1" bit and each that is not available may be recorded as a "0" bit. Alternately or additionally, these bit values could be reversed by making appropriate changes to the method described herein. In one embodiment of the invention, generation 720 of a tag mask (see FIG. 7A) may occur at this point after receiving the response from the backup server.

Based on the response from the backup server 140, the client 110 determines 714 whether one or more backup data sets have been aged out by the server, freeing up one or more entries in the root tag vector for re-use. If so, the client 110 can re-use 715 an available entry.

On the other hand, if all of the backup data sets represented by the entries in the root tag vector are validated, the client 110 ages out 716 an entry j from the root tag vector for re-use based on a combination of age and represented size. This may include, in one embodiment, calculating a combined score as a function of last access time and represented byte size for each of a plurality of entries in the root tag vector according to the following formula:

$$R(T_i,S_i)=C_{time}T_i+C_{size}S_i,$$

where $R(T_i,S_i)$ is the combined score for a root tag vector entry i having last access time $T_i$ and represented byte size $S_i$, and $C_{time}$ and $C_{size}$ are arbitrarily assigned weighting constants. According to this formula, older access times and/or smaller represented byte sizes decrease the combined score while younger access times and/or larger represented byte sizes increase the combined score.

In this case, the entries in the hash cache protected by entry j's old root hash may or may not be protected by entry j's new root hash. Thus, the method 710 may further include zeroing out 717 the tag bit $T_j$ (e.g., the tag bit corresponding to entry j) for all entries in the hash cache to reflect the lack of protection. However, as the new backup data set is generated for the root tag vector entry j, the tag bit $T_j$ for each hash cache entry included in the backup data set can be updated to reflect protection by the new root tag vector entry j.

Figure 7C:
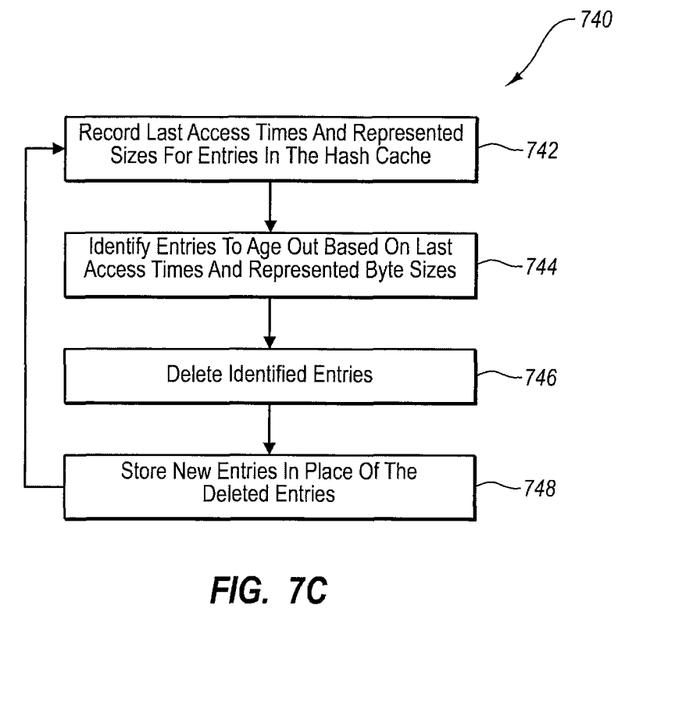
FIG. 7C depicts an example method for aging out entries in a hash cache based on the age and size of data represented by the entries that may correspond to one or more of the steps of FIG. 7A.

Turning now to FIG. 7C, the method 740 for aging out and/or selecting an entry in a hash cache for re-use is illustrated. One skilled in the art will appreciate, with the benefit of the present disclosure, that the method 740 can also be applied to aging out and/or selecting an entry in a filename cache for re-use. More generally, the method 740 can be applied to age out an entry in any cache for re-use based on a combination of age and represented size.

The method 740 begins by a client 110 (or storage application 117) maintaining 742 a last access time and a represented byte size for each of a plurality of hashes cached in a hash cache. As explained above, the last access time refers to the most recent time that a corresponding hash was included in a backup, while the represented byte size refers to the size of data (which may be expressed as an order of magnitude) represented by the corresponding hash. Thus, recording 742 the last access times for entries in the hash cache may include updating the last access time for an old entry every time that entry is used in a backup.

The last access times and represented byte sizes are used to identify or select 744 entries to age out of the hash cache to prevent it from growing too large. In one embodiment, this is accomplished by calculating a combined score as a function of last access time and represented byte size for each of a plurality of entries in the hash cache according to the following formula:

$$C(T_i,S_i)=W_{time}T_i+W_{size}S_i,$$

where $C(T_i,S_i)$ is the combined score for a hash cache entry i having last access time $T_i$ and represented byte size $S_i$, and $W_{time}$ and $W_{size}$ are arbitrarily assigned weighting constants. According to this formula, older access times and/or smaller represented byte sizes decrease the combined score while younger access times and/or larger represented byte sizes increase the combined score. While similar to the formula that may be used to age out root tag vector entries, the weighting constants used in each formula may be different or the same.

Thus, entries can be aged out of a hash cache by calculating a combined score for each of the entries in the cache and deleting one or more entries with the lowest combined score. However, a typical hash cache may include millions of entries in which case calculating combined scores for each of the entries could take a significant amount of time. To avoid this problem, the storage application 117 may only calculate a combined score for each entry within a limited span D. In one embodiment, the span D comprises the thirty two nearest entries in the hash cache. The span D may also fall within a range of entries that may be from one to one hundred entries. The span D can also be greater and may be selected automatically or manually.

In any event, once a hash value entry has been identified or selected to be aged out, it can be deleted 746 from the hash cache and a new hash value can be stored 748 in the hash cache. The method 740 then continues by storing 742 the last access times and represented byte sizes for the new entries in the hash cache and may additionally include updating the tag field for entries when the entries are used in a backup.

Advantageously, the age-out mechanism described herein selects filename and/or hash cache entries to be aged out based on both the last access times and the represented byte sizes of the entries. Conventional caches age entries out based solely on age, aging out the oldest entries to make room for new entries. However, this approach fails to consider the difference in the amount of work required to enter data of different sizes into the hash file system implemented by embodiments of the invention. For instance, hash values representing relatively small amounts of data can more easily be recalculated and entered in to the hash file system than hash values representing relatively large amounts of data.

The difference in the amount of data represented by different hash values is conceptually illustrated in FIG. 4. For instance, hash 408A represents a relatively small amount of data (comprising data atomic 406A) that may be on the order of several tens of kilobytes. Hash 408B represents a greater amount of data (comprising all of the data atomics represented by the concatenation of hash values 403) that may be on the order of a hundred kilobytes or more. Hash 408C represents the greatest amount of data (comprising all of the data represented by 408B in addition to data represented by other hashes identified in the composite 404).

One skilled in the art will appreciate, with the benefit of the present disclosure, that it would take the least amount of work to rebuild hash 408A, more work to rebuild hash 408B, and the most work to rebuild hash 408C. Consequently, in a hash cache that includes hash 408A and hash 408C (or hash 408B), it may be advisable to age out hash 408A before aging out hash 408C, even if hash 408A has been accessed more recently than hash 408C. On the other hand, if the last access time of hash 408C is significantly older than the last access time of the hash 408A, it may be advisable to age out hash 408C before hash 408A (as the older access time may be indicative that the data represented by hash 408C is no longer being backed up by the client). Thus, embodiments of the method 740 for aging entries out of a client-side filename and/or hash cache advantageously consider both the last access time and the size of data represented by the entries in aging the entries out of the filename and/or hash cache.

The embodiments described herein may include the use of a special purpose or general-purpose computer including various computer hardware or software modules, as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a system including a backup server and a client configured for communication with each other, the backup server operable to back up data sets for the client, a method of generating a de-duplicated backup data set on the client, the method comprising:

storing a cache on the client, wherein the cache includes at least a root tag vector, wherein each entry in the root tag vector corresponds to a backup data set previously backed up and maintained by the backup server, wherein the cache further includes a hash cache, wherein each entry in the hash cache corresponds to a different composite data or chunk of data;

aging out an entry in the root tag vector at the client for re-use in generating a new backup data set, wherein each entry in the root tag vector includes a root hash representative of a corresponding backup data set, a date the corresponding backup data set was created, and a size of the corresponding backup data set, and wherein the new backup data set comprises a copy of production data that was generated by the client;

generating a tag mask identifying which of the root hashes of the root tag vector exist on the backup server and which entries in the hash cache on the client are already protected by the backup server by the identified root hashes;

identifying and eliminating redundant data in the new backup data set at the client before sending the new backup data to the backup server set by hashing files, file pieces, and composite data of the new backup data set, comparing the resulting hash values to entries in the hash cache, and when a resulting hash value matches an entry in the hash cache, replacing the corresponding redundant data in the new backup data set with the resulting hash value that points to a single instance of the data in content addressed storage accessed through the backup server, and, for data in the new backup data set not referenced in the hash cache, querying the backup server to determine if the data not referenced in the hash cache exists on the backup server, wherein data in the new backup data set existing on the server is replaced with a hash value received from the backup server, wherein the redundant data is eliminated from the new backup data set at the client before sending the new backup data set to the backup server;

aging out entries in the hash cache based on last access times and sizes of data represented by the entries such that resulting hash values that do not match entries in the hash cache can be entered into the hash cache;

sending the new backup data set from the client to the backup server after the redundant data is identified and eliminated; and asking the backup server to add the new backup data set to the content addressed storage, the new backup data set being represented by a new root hash entered into the re-used entry in the root tag vector.

2. The method of claim 1, wherein the new backup data set includes new data not previously stored in the content addressed storage, resulting hash values pointing to the new data, and resulting hash values pointing to data already stored in the content addressed storage, without including data already stored in the content addressed storage.

3. The method of claim 1, wherein aging out an entry in a root tag vector for re-use in generating a new backup data set includes:

asking the backup server to validate the root tag vector;

receiving a response from the backup server identifying which of the root hashes identified in the root tag vector exist on the backup server; and if all of the root hashes identified in the root tag vector exist on the backup server, aging out the entry of the oldest root hash.

4. The method of claim 3, wherein the hash cache includes a tag field for each hash cache entry, the tag field for a hash cache entry including a plurality of tag bits that identify which of the root hashes of the root tag vector the hash cache entry is protected by.

5. The method of claim 4, wherein the response from the backup server comprises a bit sequence and wherein generating a tag mask identifying which of the root hashes of the root tag vector exist on a backup server and which entries in a hash cache are protected by the identified root hashes includes combining the tag field for each entry with the bit sequence from the backup server.

6. The method of claim 1, wherein aging out entries in the hash cache based on last access times and sizes of data represented by the entries includes:

for each entry over a limited span of entries, calculating a combined score based on a last access time and a size of data represented by the corresponding entry;

identifying the entry with the lowest combined score; and deleting the identified entry.

7. The method of claim 6, wherein the limited span of entries comprises at least one of thirty-two entries or less than one hundred entries.

8. A non-transitory physical storage media having stored therein computer-executable instructions which, when executed by one or more hardware components, implement a process for generating a de-duplicated backup data set on the client, wherein implementation of the process comprises performing the method of claim 1.

9. In a system including a backup server that backs up data sets for a client, a method of generating a de-duplicated backup data set on the client, the method comprising:

storing a cache on the client, wherein the cache includes at least a root tag vector, wherein each entry in the root tag vector corresponds to a backup data set previously backed up and maintained by the backup server, wherein the cache further includes a hash cache, wherein each entry in the hash cache corresponds to a different composite data or chunk of data;

aging out an entry in the root tag vector for re-use in generating a new backup data set, wherein the root tag vector includes a plurality of entries corresponding to a plurality of previous backup data sets maintained by the backup server, each entry including a root hash representative of a corresponding backup data set, a date the corresponding backup data set was created, and a size of the corresponding backup data set;

generating a tag mask identifying which of the root hashes of the root tag vector exist on the backup server and which entries in the hash cache on the client are protected by the identified root hashes;

identifying and eliminating redundant data in the new backup data set at the client before sending the new backup data to the backup server by hashing files, file pieces, and composite data of the new backup data set, comparing the resulting hash values to entries in the hash cache, and when a resulting hash value matches an entry in the hash cache, replacing the corresponding redundant data in the new backup data set with the resulting hash value that points to a single instance of the data in content addressed storage accessed through the backup server;

aging out entries in the hash cache based on last access times and sizes of data represented by the entries such that resulting hash values that do not match entries in the hash cache can be entered into the hash cache; and asking the backup server to add the new backup data set to the content addressed storage, the new backup data set being represented by a new root hash entered into the re-used entry in the root tag vector.

10. The method of claim 9, wherein the new backup data set includes new data not previously stored in the content addressed storage, resulting hash values pointing to the new data, and resulting hash values pointing to data already stored in the content addressed storage, without including data already stored in the content addressed storage.

11. The method of claim 9, wherein aging out an entry in a root tag vector for re-use in generating a new backup data set includes:

asking the backup server to validate the root tag vector;

receiving a response from the backup server identifying which of the root hashes identified in the root tag vector exist on the backup server; and if all of the root hashes identified in the root tag vector exist on the backup server, aging out the entry of the oldest root hash.

12. The method of claim 9, wherein aging out entries in the hash cache based on last access times and sizes of data represented by the entries includes:
for each entry over a limited span of entries, calculating a combined score based on a last access time and a size of data represented by the corresponding entry;
identifying the entry with the lowest combined score; and
deleting the identified entry.

* * * * *